United States Patent Office 3,512,930

Patented May 19, 1970

3,512,930

STABILIZED FERROMAGNETIC CHROMIUM DIOXIDE

William George Bottjer, Wilmington, and Henry Gilbert Ingersoll, Hockessin, Del., assignors to E. I. du Pont de Nemours and Company, Wilmington, Del.

No Drawing. Continuation-in-part of application Ser. No. 732,109, May 27, 1968. This application May 7, 1969, Ser. No. 822,683

Int. Cl. C01g *37/02*

U.S. Cl. 23—145 13 Claims

ABSTRACT OF THE DISCLOSURE

Ferromagnetic chromium dioxide particles stabilized against degradation of magnetic properties by a protective phase on the surface of the particles is prepared by treating preformed ferromagnetic chromium dioxide with a reducing agent in the gaseous, liquid, or solution phase until a more stable phase is formed, characterized in that it does not oxidize benzhydrol, the preferred particles being further characterized in that the X-ray diffraction pattern has a line corresponding to an interplanar spacing of 3.151±0.006 A.

This application is a continuation-in-part of Ser. No. 732,109, filed May 27, 1968, now abandoned.

CROSS-REFERENCES TO RELATED APPLICATIONS

Assignee's copending application, "Process for Improving Ferromagnetic Properties of Chromium Dioxide by Heating in an Oxidizing Environment," by Bottjer and Cox, filed Feb. 13, 1968, U.S. Ser. No. 705,029, describes the "upgrading" process which prepares chromium dioxide for use in the preferred embodiment of the present invention.

The present case covers stabilizing chromium dioxide by a reductive surface treatment prior to its incorporation in a magnetic recording member.

BACKGROUND OF THE INVENTION

Field of the invention.—This invention relates to ferromagnetic chromium dioxide having modified surface characteristics, to processes for preparing the same, and to magnetic recording members embodying the chromium dioxide particles.

Description of the prior art.—It is well known in the art that ferromagnetic chromium dioxide possesses many desirable characteristics which make it useful for certain applications in the manufacture of magnetic recording tapes, magnetic memory recorders, computers and other applications. The preparation of ferromagnetic chromium dioxide can be carried out under high pressures such as the processes described in U.S. Pats. 2,956,955; 3,117,093; and 3,278,263. In Pat. No. 3,117,093, the higher oxides of chromium, of the general formula $Cr_xO_y$, wherein the ratio of $2y$ to $x$ ranges between 4 and 6, are heated in an aqueous acid medium at pressures ranging between 50 and 3,000 atmospheres at temperatures of 250–500° C. The products of the above patents possess very desirable magnetic properties.

Magnetic properties which are particularly important are the intrinsic coercive force ($H_{ci}$), saturation per gram ($\sigma_s$), retentivity or remanence per gram ($\sigma_r$), and the ratio of the remanence to the saturation ($\sigma_r/\sigma_s$). Retentivity and saturation are defined on pages 5–8 of Bozorth's "Ferromagnetism," D. Van Nostrand Co., New York (1951). The sigma values ($\sigma$) herein are determined in a field of 4,400 oersteds on apparatus similar to that described by T. R. Bardell, "Magnetic Materials in the Electrical Industry," Philosophical Library, New York (1955), pages 226–228. The definition of intrinsic coercive force ($H_{ci}$) is given in Special Technical Publication No. 85 of the American Society for Testing Materials entitled "Symposium on Magnetic Testing" (1948), pages 191–198. The values for the intrinsic coercive force given herein are determined on a DC ballistic type apparatus which is a modified form of the apparatus described by Davis and Hartenheim in the Review of Scientific Instruments, 7, 147 (1936).

For the preparation of high quality recording members, it is preferred that the magnetic material before reduction possess a saturation, $\sigma_s$, of at least 75 emu./gram. Materials having a saturation per gram above 80 yield particularly desirable products. In this invention, the ratio of the remanence to the saturation magnetization ranges up to 0.5. Products having a coercive force of 250–600 oersteds are particularly suited for use in the preparation of magnetic recording members. However, products having coercive force above 200 oersteds can be satisfactorily used.

However, because chromium dioxide slowly reacts with water and some organic materials to form nonmagnetic materials, some of its desirable properties are diminished with age. The stabilized chromium dioxide of this invention is much less reactive toward water and organic compounds than the unstabilized compound. Hence, this stabilized oxide retains all of its advantages for any practical length of time.

SUMMARY OF THE INVENTION

Acicular ferromagnetic chromium dioxide particles are protected against reaction with organic binders or water by a barrier comprising a protective phase on the surface of the particles which does not oxidize benzhydrol. Said barrier is produced on the surface of the praticles by treating the particles with a reducing agent for metal oxides to convert at least some of the surface of the $CrO_2$ particles to a more stable phase which does not react with water or organic materials, does not oxidize benzhydrol, and the X-ray diffraction pattern of which has a line corresponding to an interplanar spacing of 3.151±0.006 A. Thus the underlying $CrO_2$ is protected from attack by the surrounding materials. The magnetic recording members or elements of the invention embody a layer containing the protected particles.

It is an object of this invention to provide superior ferromagnetic chromium dioxide. Another object is to provide a ferromagnetic chromium dioxide stabilized against attack by water and some organic materials. A further object is to provide recording discs, drums, and tapes that are so stabilized. It is also an object of this invention to provide ways to make said ferromagnetic chromium dioxide having superior stability. Further, objects will be apparent from the description of the invention.

In practicing this invention, any preformed ferromagnetic $CrO_2$ may be used, but it is desirable to use a form having high coercivity and high remanent magnetization. Suitable ferromagnetic chromium dioxide starting materials include those described in and/or defined by the claims of U.S. Pats. 2,885,365; 2,923,684; 2,923,685; 3,034,988; and 3,278,263. Starting chromium dioxide materials and particles of this invention having the reduced protective phase on their surfaces, contain 55% to 61.9% by weight of chromium and may have an average length of not more than 10 microns, no more than 10% of the particles being longer than 10 microns.

In practicing this invention, the finely divided preformed chromium dioxide is treated with a reducing agent to such an extent that there is produced a protective barrier on the surface of the chromium dioxide particles so that they do not oxidize benzhydrol, and preferably until the X-ray diffraction pattern of which has a line corresponding to an interplanar spacing of 3.151±0.006 A.

To determine whether a suitable barrier has been produced the following test may be used:

Benzhydrol is readily oxidized to benzophenone by $CrO_2$ in 1,1,1,2-tetrachloro-2,2-difluoroethane (Freon® 112A, made by E. I. du Pont de Nemours and Company, Inc., Wilmington, Del.) solution. However, under the same conditions, the protective phase does not oxidize benzhydrol. Hence, the rate at which benzhydrol is oxidized to benzophenone by a sample of $CrO_2$ which has been subjected to the reductive surface treatment of this invention will be very small for a sample that has a good protective barrier and faster for a sample having a poorer protective barrier. The benzhydrol test is performed in the following way:

(1) 1.0 gram of benzhydrol (Eastman No. 1432) is dissolved in 100 ml. of Freon® 112A in a glass-stoppered 125 ml. flask, and the solution is kept in a thermostatically-controlled bath at 65° C.

(2) 2.0 grams of the oxide to be tested are added and allowed to react with gentle shaking such as that provided by an Eberbach water-bath shaker operated at 50 to 100 strokes per minute.

(3) Periodically (at 1, 2, 4, 6, etc. hours) 0.5 ml. of the clear solution is removed and analyzed for the quantities of benzophenone and benzhydrol present by a gas chromatograph equipped with a hydrogen flame ionization detector. For this analysis, the chromatograph is fitted with a 4-foot column of 6% diethylene glycol succinate on diatomaceous earth (Hewlett-Packard LAC 728, 60–80 WAWDMCS) and used at 200° C. The detector should be sensitive enough to detect $10^{-7}$ grams of benzophenone (corresponding to 0.02% magnetic degradation of the $CrO_2$). It is necessary to warm the injection syringe before injecting 20 microliters of the test solution into the gas chromatograph.

(4) Initially the amount of benzophenone formed or the equivalent amount of $CrO_2$ degraded increases linearly with time. The percent of degradation is plotted against time to give the initial rate of reaction. This initial rate of reaction with benzhydrol is slower for $CrO_2$ which has a protective barrier produced by reductive surface treatment than it is for unprotected $CrO_2$. The slower the initial rate of reaction with benzhydrol, the slower will be the deterioration of magnetic properties of the $CrO_2$ when exposed to moisture or reactive organic materials.

Chromium dioxide which has been given a protective barrier effective enough for a preferred embodiment of this invention can be characterized in another way. The X-ray diffraction pattern of chromium dioxide powder has a line corresponding to a spacing between atomic planes of 3.11 A. Orthorhombic CrO(OH), which may also be produced from chromium dioxide by chemical disproportionation reaction has a line in its X-ray diffraction pattern corresponding to an interplanar spacing of 3.21 A. The X-ray diffraction pattern of chromium dioxide which has been so treated by the process of this invention that about 5%–30% of the initial remanent magnetization has been lost has a new line corresponding to an interplanar spacing of 3.151±0.006 A. This new line is characteristic of the protective phase and is the more prominent the more stabilized the $CrO_2$. This line is easily detectable in $CrO_2$ which has been chemically reduced by 5% and may be presumed to be present, though difficult to detect, in chromium dioxide which has been chemically reduced less than 5% by weight.

These X-ray diffraction patterns were measured with a Norelco scanning diffractometer using a scanning time of ⅛° per minute and a slit width of 1°. The curves were resolved using a Du Pont Model 310 curve resolver.

In producing the improved ferromagnetic chromium dioxide, the preformed dioxide is treated with a chemical reducing agent which reacts with the surface of the chromium dioxide particles to form a protective phase having the characteristics given above. This protective phase does not react with water or the organic materials which attack chromium dioxide. Hence, the underlying chromium dioxide is protected from attack by moisture and organic materials with which it might be in contact.

The reducing agent may be organic or inorganic, gaseous or liquid, or a compound dissolved in a solvent. When the reductant is gaseous, the chromium dioxide is conveniently treated in a shaken pressure vessel with an atmosphere of reductant. The pressure and temperature of the reaction affect the rate of reaction and, hence, the time required to form a suitable protective barrier, but they are not critical for operation of the process.

In aqueous media, the reductive surface treatment may be carried out at any pH between 1 and 13. Suitable reducing agents are all compounds having a standard oxidation potential in acidic media greater than about −1.5 volts, and preferably greater than about −1.36 volts. The useful reducing agents are reducing agents for metal oxides, and suitable agents include $H_2S$, sodium sulfite, $SO_2$, alkanols, e.g., of 1 to 18 carbon atoms. From 0.005 to 50 parts of reducing agent can be used per part, by weight, of $CrO_2$, at a temperature of −10° C. to 250° C. until a product having the above-recited characteristics is formed, e.g., for a period of 0.5 to 1000 hours.

The reduction need not be done in aqueous media, however. Organic liquid reducing agents such as ethanol and acetylacetone work well. Organic liquid or solid reducing agents in solution in an organic solvent such as cyclohexane or in water may also be used.

Reductive surface treatment may also be combined with other stabilizing surface treatments, for example, by reacting chromium dioxide with nickel tetracarbonyl $(Ni(CO)_4)$ or m-trifluoromethylphenyl copper $$(m\text{—}CF_3C_6H_4Cu)$$

which form protective phases containing nickel and copper, respectively.

In a preferred embodiment of this invention, finely divided acicular ferromagnetic chromium dioxide which has been treated according to the process disclosed in assignee's copending application by Bottjer and Cox, filed Feb. 13, 1968, U.S. Ser. No. 705,029, is treated in a stirred aqueous slurry with sodium bisulfite at 0° C. to 100° C. The temperature of reaction and concentration of sodium bisulfite are not critical to the operation of the process, but they do affect the rate of reaction. The rate of reaction is related to the principal variables in the process by the equation:

$$r=3050e^{9500/RT}C_{SB}^{0.13}(SA)^{0.25}+0.08$$

where:

$r$=rate of reduction of $CrO_2$ in percent per hour.
R=gas constant=1.98 cal./deg./gm. mole.
T=temperature in ° K.
$C_{SB}$=concentration of sodium bisulfite expressed as grams $NaHSO_3$ per gram $CrO_2$ in the reactor.
(SA)=specific surface area of $CrO_2$ in square meters per gram.

The reaction is conveniently run at 55° C., with a sodium bisulfite concentration of 2.25 grams per gram of $CrO_2$ for 15 hours.

Mild agitation is normally used to facilitate contact between the chromium dioxide particles and the solution; however, agitation is not necessary. Similarly, the concentration of $CrO_2$ is not critical because the material is insoluble in water.

The reductive surface treatment may also be combined with the milling and dispersing of the chromium dioxide in a binder for preparation of magnetic recording members.

The following examples will illustrate this invention, but are not intended to limit its scope. The chromium dioxide used in these examples was prepared according to Cox, U.S. Pat. 3,278,263, and had, before reduction, a saturation of at least 75 emu./g. and a coercive force of 250–600 oersteds.

Example I

One hundred grams of chromium dioxide was pulverized to break up lumps, then heated for 2 hours at 335° C. in an oven provided with forced air draft. (This is the upgrading treatment disclosed in assignee's copending application by Bottjer and Cox, filed Feb. 13, 1968, U.S. Ser. No. 705,029.) The oxide was dispersed in 400 ml. of water at 1° C. in a one-quart liquid blender. Into an agitated, aqueous slurry of the particles there were metered 1150 ml. of $H_2S$ gas from a gas buret. The slurry was filtered through a Buchner funnel having a water jacket filled with chilled water. The filter cake was washed several times with separate 400 ml. portions of acetone and air dried.

The treated oxide was used to make a magnetic recording tape using the polyester polyurethane-vinylidene chloride/acrylonitrile copolymer mixture like Formulation B, Table VII, of assignee's Proskow U.S. application Ser. No. 655,022, filed Sept. 1, 1967 (now abandoned, but refiled as continuation-in-part application Ser. No. 832,080, filed June 11, 1969, wherein "Formulation B, Table VII," in the parent application appears as "Formulation B, Table A" in the refiled application), except that soya lecithin was substituted for the methyl methacrylate/vinylpyridine copolymer.

The remanent flux $\Phi_r$ of a ½"-wide sample of the finished tape was measured on a DC ballistic type magnetometer when the sample was fresh and again after periods of accelerated aging at elevated temperature and high relative humidity (65° C. and 50% RH). The time required for $\Phi_r$ to decline to 90% of its initial value is defined as $t_{10}$ and is used to characterize the stability of the oxide in a particular tape. Experience has shown that one day of aging under the said conditions is equivalent to about one year of aging under normal storage conditions.

The $t_{10}$ of this oxide sample was 7.5 days. Similar oxide samples which had not been given a reductive surface treatment had $t_{10}$'s of 1 to 3 days when incorporated into magnetic tapes and aged as above.

Example II

Ten grams of the disodium salt of ethylenediamine tetraacetic acid was dissolved in one liter of distilled water in a 3-neck flask. To this solution there was added 20.0 grams of acicular $CrO_2$ and the slurry was heated to boiling (9 min. to 50° C., 28 min. to boiling) and boiled for 2 minutes. The slurry was filtered hot and the $CrO_2$ was washed with 1,000 ml. of distilled water and 500 ml. of acetone and dried. The oxide was made into a tape and tested by the procedure of Example I. The $t_{10}$ was 5.2 days.

Example III

Eighty-eight grams of $CrO_2$ prepared by pulverizing to pass through a 3-mesh screen and heated as described in Example I, was then milled to less than 10-micron particle size and the particles were dispersed in one liter of a 50.0 g./l. solution of sodium bisulfite in distilled water. The mixture was reacted at 65° C. for 16 hours with mild agitation to keep the oxide suspended.

The reduced oxide was filtered through Whatman No. 42 filter paper in a Buchner funnel. The oxide was washed with 5 one-liter portions of room temperature demineralized water to remove dissolved salts and air-dried overnight at room temperature. Final traces of moisture were removed by 24 hours evacuation at room temperature. The dried product was then crushed to pass a 12-mesh screen. Magnetic measurement indicated a loss in $\sigma_s$ of 19.1%.

The stabilized oxide was made into tapes and tested by the procedure of Example I. The $t_{10}$ was 123 days.

Example IV $CrO_2$ was prepared and treated as in Example III, except that it was not heated in air prior to the reductive surface treatment, and treatment was at 55° C. for 15 hours with a $NaHSO_3$ to $CrO_2$ ratio of 2.25 to 1 by weight. Tape made from this oxide and tested by the procedure of Example I had a $t_{10}$ of 15.5 days.

Examples V–XVIII

Several samples of $CrO_2$ were treated with aqueous sodium bisulfite as in Example III. In Examples V through X, the oxide was heated as in Example I before the reductive surface treatment, while in Examples XI through XVIII, the oxide was not so heated. The results of this series of experiments are given in Table I and illustrate various conditions which can be used when treating chromium dioxide by the process of this invention.

TABLE I

| Example | Ratio of $NaHSO_3$ to $CrO_2$ by weight | Reaction Temp (°C.) | Reaction time (hr.) | $t_5$* at 65° C. and 50% RH (days) |
|---|---|---|---|---|
| V | 4.0 | 55 | 16 | 9.0 |
| VI | 0.5 | 55 | 16 | 14.5 |
| VII | 2.25 | 55 | 48 | 17.0 |
| VIII | 2.25 | 55 | 3 | ($t_{10}$) 22.0 |
| IX | 2.25 | 85 | 16 | 43.0 |
| X | 2.25 | 25 | 16 | ($t_{10}$) 11.5 |
| | | | | $t_{10}$ at 65° C. and 50% RH (days) |
| XI | 2.25 | 25 | 3 | 10.6 |
| XII | 0.5 | 55 | 3 | 10.0 |
| XIII | 4.0 | 55 | 3 | 10.5 |
| XIV | 0.5 | 25 | 15 | 9.9 |
| XV | 4.0 | 25 | 15 | 10.8 |
| XVI | 2.25 | 55 | 15 | 15.5 |
| XVII | 2.25 | 85 | 3 | 19.5 |
| XVIII | 4.0 | 85 | 15 | 56.0 |

*$t_5$=days for 5% loss in $\Phi_r$.

Example XIX

Chromium dioxide was prepared and treated as in Example III. The stabilized oxide was incorporated into magnetic recording tape using a binder like Formulation A, Table VII, as disclosed in the copending application by Proskow, filed Sept. 1, 1967, U.S. Ser. No. 665,022, Formulation A, Table A, in continuation-in-part application Ser. No. 832,080, June 11, 1969. This tape when aged as in Example I had a $t_{10}$ of 118 days. A sample of chromium dioxide prepared as in Example I, but not given a reductive surface treatment, had a $t_{10}$ of about 20 days in this binder.

Example XX

Fifty grams of $CrO_2$ prepared and heated as in Example I was added to 500 ml. of a solution of 20.8 g. of $NaHSO_3$ per liter buffered at pH 9.4 with an ammonium hydroxide/ammonium nitrate buffer. The mixture was heated with agitation at 65° C. for 20 hours. The slurry was filtered, washed, and dried as in Example III. Magnetic measurements showed a loss in $\sigma_s$ of 14%. Tape made from this oxide and tested by the procedure of Example I had a $t_{10}$ of about 36 days.

Example XXI

Fifty grams of $CrO_2$ prepared and heated as in Example I was placed in a flask with 500 ml. of distilled $H_2O$. Then, 19.64 grams of 50% aqueous hypophosphorous acid was added and the reaction was carried out with mild agitation at 65° C. for 24 hours. The slurry was filtered and the oxide was washed and dried as in Example III. Tape made from this oxide and tested by the procedure of Example I had a $t_{10}$ of about 27 days.

Example XXII

Fifty grams of chromium dioxide prepared as in Example I were placed in the thimble of a Soxhlet extractor and extracted with ethanol at 60–70° C. for 24 hours. The treated oxide was washed with mother liquid, air dried, incorporated into magnetic recording tape, and tested as in Example I. The tape had a $t_{10}$ of 53 days.

Example XXIII

Fifty grams of chromium dioxide were treated as in Example XXII except that the oxide was not heated in air by the procedure of Example I before reductive surface treatment. Tape made from this oxide had a $t_{10}$ of 18.5 days.

Samples of ferromagnetic chromium dioxide were given reductive surface treatments with different reagents as set forth in preceding Example XXI and in the following two examples. As a control, the chromium dioxide starting material of Example I was prepared as described in Cox U.S. Pat. 3,278,263, but it was not upgraded nor given a reductive surface treatment as described in Example I. These four samples were tested by the benzhydrol test given above, were characterized by their X-ray diffraction patterns, and were incorporated into tapes and tested by the procedure of Example I. The results of these tests are given in Table II following Example XXV.

Example XXIV

Chromium dioxide was prepared in accordance with Example XXI, except that the treatment with $H_3PO_2$ was for 120 hours instead of 24 hours.

Example XXV

The chromium dioxide starting material was prepared and upgraded as described in Example I. Instead of the reductive treatment of said example, it was treated in anhydrous ethanol at 60–70° C. for 24 hours as described in Example XXII.

solution of acetylacetone in water. The mixture was agitated at 65° C. overnight. The slurry was filtered and the oxide was washed with water and acetone and dried. Tape made with this oxide and tested by the procedure of Exmple I had a $t_{10}$ of 14.4 days.

Example XXVIII

Forty grams of chromium dioxide prepared and heated as in Example I, was dispersed in 416 grams of cyclohexane in a liquid blender. The slurry was poured into a stainless steel rocker bomb which was then charged with 200 grams of $H_2S$ (15.6 moles $H_2S$ per mole $CrO_2$—to give 25 atmospheres total pressure at 65° C.). The bomb was rocked for 16 hours at 65° C. After the reaction, the solvent was removed and the oxide was washed with acetone and air-dried. Tape made from this oxide and tested by the procedure of Example I had a $t_{10}$ of 90 days.

Example XXIX

Ferromagnetic $CrO_2$ particles (188 grams) and 818 ml. of n-octyl alcohol were blended for 6 minutes in a high-speed liquid blender. Octyl alcohol (50 ml.) was added and the mixture was heated at 125° C. with stirring for one hour. After the mixture was cooled, the $CrO_2$ was separated, washed several times with tetrahydrofuran, and dried at 62° C. overnight. Tapes made from this oxide using a polyester polyurethane-vinylidene chloride/acrylonitrile copolymer-soya lecithin formulation like that of Example I, but containing about 3% by weight of silicone oil, when tested by the procedure of Example I had a 3% loss in remanent magnetization after 3 days. Control tapes of untreated oxide had a 10% loss in 3 days.

TABLE II

| Example | Treatment | Tape $t_{10}$ (days) | Initial rate of reaction with benzhydrol (percent per hr.) | Relative intensities of X-ray diffraction peaks 3.11 A. | 3.15 A. |
|---|---|---|---|---|---|
| Control | Not treated | 2.0 | 2.1–2.5 | | |
| XXI | (a) Upgraded<br>(b) Treated | 27.0 | 0.009 | 85.0 | 12.5 |
| XXIV | (a) Upgraded<br>(b) Treated | 36.7 | 0.004 | 79.0 | 16.5 |
| XXV | (a) Not upgraded<br>(b) Treated | 25.0 | 0.028 | 82.0 | 13.0 |

These results show that an oxide stabilized by reductive surface treatment has a longer $t_{10}$ when incorporated into magnetic recording tape and tested by the procedure of Example I, has a lower initial rate of reaction with benzhydrol, and shows a prominent X-ray diffraction peak corresponding to an interatomic spacing of 3.15 A. as compared with an oxide that has not been treated by the process of this invention.

Example XXVI

Forty grams of chromium dioxide, prepared and heated as in Example I, was dispersed in 350 grams of cyclohexane with a high-speed liquid blender. The slurry was poured into another vessel containing cyclohexane so that the final mixture contained 40.0 grams of $CrO_2$ in 620 grams of cyclohexane. The temperature was kept at 25° C. Then 6330 ml. of hydrogen sulfide (0.65 mole $H_2S$ per mole $CrO_2$) was added at one atmosphere pressure over a period of 80 minutes. The reaction was allowed to proceed for 114 hours. The oxide was separated from the process liquid, washed with acetone and dried. Tape made from this oxide and tested by the procedure of Example I had a $t_{10}$ of 37 days.

Example XXVII

Forty-nine grams of chromium dioxide, prepared and heated as in Example I, was added to 490 ml. of a 10% [continued in column 8 above]

Example XXX

To a solution of 14.0 grams of methyl methacrylate/2-methyl-5-vinylpyridine (90/10) copolymer in 396 grams of acetone, ferromagnetic $CrO_2$ particles (200 g.) were added slowly with stirring under a nitrogen atmosphere. The slurry was dispersed in a high-speed liquid blender for 5 minutes, then ball-milled for 6 days. The slurry was then heated at gentle reflux under a nitrogen atmosphere for 24 hours. The slurry was then used to prepare a magnetic tape like that given in Example XIX. The tape was tested as in Example I. The $t_{10}$ was 17.1 days. A control tape, similarly prepared, but without the 24-hour heating step, had a $t_{10}$ of 12.8 days.

The rate of reaction equation discussed hereinbefore was derived by non-linear regression analysis of the data from some of the preceding examples. The particular equation previously given is specific to sodium bisulfite. It is to be understood, however, that the equation is general in form, and that the values assigned to the constants and exponents in a given instance will be specific for such factors as the reducing agent used, whether or not the chromium dioxide was previously heated( upgraded), and the like. In all cases, it was found that the data could be fitted only to an equation that included a constant (e.g., the final term 0.08 in the particular equation set forth hereinbefore) representing the amount of protective coating formed immediately (as gm. coating/gm. oxide), i.e., only when it was considered that a finite reduction occurred at zero time. To verify this indication of essentially instantaneous reaction between reducing agent and chromium dioxide, additional samples were prepared comparing short and long treatment times at different temperatures, as set forth in the following four examples. The treated chromium dioxides of these examples were characterized by their X-ray diffraction patterns, and they were made into tapes and tested by the procedure of Example I. The results of these tests are given in Table III.

Example XXXI

Fifty grams of chromium dioxide, prepared according to Cox U.S. Pat. 3,278,263 then pulverized and heated as described in Example I, were added rapidly to a flask containing a solution of 25 g. $Na_2SO_3$ in 1500 ml. of distilled water, the solution of reducing agent having already been heated to 85° C. After two minutes of contact at that temperature, the contents of the flask were poured rapidly onto an 8-inch Buchner funnel fitted with Whatman No. 42 filter paper. Separation of the reducing agent solution and the treated chromium dioxide was effected within 10 minutes, during which time the solution had cooled to room temperature. On the basis of the rate equation already discussed, the 10-minute exposure at decreasing temperature was considered equivalent to about 2.5 minutes of additional exposure at 85° C. The total exposure of chromium dioxide to reducing agent was thus considered to be 4.5 minutes at 85° C. The wet filter cake was washed with 4 liters of distilled water at room temperature, then dried at room temperature for 16 hours in a forced draft followed by 20 hours under vacuum.

Example XXXII

Example XXXI was repeated except that the reducing medium was a solution of 25 g. $NaHSO_3$ in 1500 ml. of distilled water.

Example XXXIII

Example XXXI was repeated except that the solution of $Na_2SO_3$ was not heated. The chromium dioxide was exposed to the solution of reducing agent at room temperature (21° C.) for thirty minutes.

Example XXXIV

Example XXXIII was repeated except that the reducing medium was a solution of $NaHSO_3$ as in Example XXXII.

TABLE III

| Example | Treatment | | | Tape $t_{10}$ (days) | Relative intensities of X-ray diffraction peaks | |
|---|---|---|---|---|---|---|
| | Agent | Temp., ° C. | Time, min. | | 3.11 A. | 3.15 A. |
| XXXI | $Na_2SO_3$ | 85.0 | 4.5 | 9.5 | 83.0 | 13.5 |
| XXXII | $NaHSO_3$ | 85.0 | 4.5 | 8.0 | 80.5 | 15.0 |
| XXXIII | $Na_2SO_3$ | 21.0 | 30.0 | 7.2 | 84.5 | 13.0 |
| XXXIV | $NaHSO_3$ | 21.0 | 30.0 | 7.2 | 85.5 | 12.0 |

From the data in Table III, it is apparent that the stabilization achieved by short exposure at 85° C. is at least equivalent to that obtained by 30-minute exposure to the same reducing agents at room temperature, and that the minimum exposure times possible within practical manipulative limitations will give sufficient time for the reduction reaction to take place, so long as the relationships of the rate equation are observed, as will be understood by one skilled in the art.

The chromium dioxide particles made in accordance with each of the foregoing examples are characterized in that they oxidize benzhydrol more slowly than unreduced particles, i.e., less than 0.2% of benzhydrol is oxidized within 1 hour, by the test given above, and the X-ray diffraction pattern has a line corresponding to an interplanar spacing of 3.151±0.006 A.

Magnetic recording members or elements including drums, discs, and tapes, can be made by known procedures and using the known binding agents including those described in the patents listed above, and the binding agents listed in Benning U.S. Pat. 2,948,707 and Pratt et al. U.S. Pat. 2,418,479. As binder materials, there may be used chlorinated butyl rubber, polystyrene, polymethyl methacrylate, polyethylene terephthalate, polyvinyl chloride, polyvinyl fluoride, polytetrafluoroethylene and other fluorocarbon polymers, polyurethanes, polybutadiene, polyisoprene, polyamides, polyethylenes, vinylidene chloride copolymers, e.g., with vinyl chloride, vinyl acetate, or acrylonitrile, and mixtures of said binding agents. Reticular carbon, plasticizers and other adjuvants can be used in such members or elements. Suitable additional adjuvants are listed in the Pratt et al. patent.

ADVANTAGES OF THE INVENTION

The ferromagnetic chromium dioxide prepared by this invention can be used for magnetic coatings for recording tapes, drums, and records, magnetic memory cores, computers, or cores for microwave attenuators, gryrator elements, electrically operated high-frequency switches, low-loss transformer cores for high-frequency ranges, focusing magnets, magnetic clutches, and thermal-magnetic document copiers. In all applications, the desirable properties of ferromagnetic chromium dioxide made in accordance with this invention are preserved and the ferromagnetic stability of the final products is improved.

The embodiments of the invention in which an exclusive property or privilege is claimed are defined as follows:

1. Acicular ferromagnetic chromium dioxide particles having a reduced protective phase derived from said chromium dioxide on their surfaces, characterized in that the X-ray diffraction pattern of the particles has a line corresponding to an interplanar spacing of 3.151±0.006 A.

2. Ferromagnetic chromium dioxide particles according to claim 1 containing chromium in an amount of 55% to 61.9%, by weight, the particles being of tetragonal crystal structure having an average length not more than 10 microns, no more than 10% of the particles being longer than 10 microns.

3. Particles according to claim 1 that are further characterized in that less than 0.2% of benzhydrol is oxidized within one hour in a dispersion in 1,1,1,2-tetrachloro-2,2'-difluoroethane at 65° C.

4. Acicular ferromagnetic chromium dioxide particles having a reduced protective phase derived from said chromium dioxide on their surfaces, characterized in that less than 0.2% of benzhydrol is oxidized within one hour in a dispersion in 1,1,1,2-tetrachloro-2,2'-difluoroethane at 65° C.

5. A process which comprises reacting acicular ferromagnetic chromium dioxide particles essentially free from other chromium-oxygen compounds with a reducing agent for metal oxides until the surface of the particles is reduced, the initial remanent magnetization of the particles being lowered an amount within the range 5%–30%, and the X-ray diffraction pattern of the reduced particles has a line corresponding to an interplanar spacing of 3.151±0.006 A.

6. A process which comprises reacting preformed acicular ferromagnetic chromium dioxide particles with 0.005 to 50 parts by weight of a reducing agent for metal oxides at a temperature of −10° C. to 250° C. to form a reduced protective phase derived from said chromium dioxide on their surfaces.

7. A process according to claim 6 wherein said reducing agent is $H_2S$.

8. A process according to claim 6 wherein said reducing agent is an alkali metal bisulfite.

9. A process according to claim 6 wherein said reducing agent is an alkanol.

10. A process whicsh comprises reacting preformed acicular ferromagnetic chromium dioxide particles with 0.005 to 50 parts by weight per part by weight of said particles of a reducing agent for metal oxides at a temperature of −10° C. to 250° C. until the surface of the particles is reduced, the initial remanent magnetization of the particles being lowered an amount within the range 5%–30%, and the X-ray diffraction pattern of the reduced particles has a line corresponding to an interplanar spacing of 3.151±0.006 A.

11. A process according to claim 10 wherein the particles are reacted in an aqueous medium at pH 1–13 and the reducing agent has a standard oxidation potential greater than about −1.36 volts.

12. A process according to claim 10 wherein the ferromagnetic chromium dioxide reacted with the reducing agent was made by heating preformed $CrO_2$ having a saturation of at least 75 emu./g. and a coercive force of 200–600 oersteds in an oxidizing environment at 150° C. to 450° C. at a pressure of 0.2–3,000 atmospheres.

13. A magnetic recording member comprising a support bearing a layer containing acicular ferromagnetc chromium dioxide particles as defined in claim 1.

References Cited

UNITED STATES PATENTS

| | | | |
|---|---|---|---|
| 3,371,043 | 2/1968 | Hund et al. | 252—62.51 |
| 3,449,073 | 6/1969 | Balthis | 252—62.51 X |

TOBIAS E. LEVOW, Primary Examiner

J. COOPER, Assistant Examiner

U.S. Cl. X.R.

117—234; 252—62.51